(12) United States Patent
Thalhammer

(10) Patent No.: US 11,865,795 B2
(45) Date of Patent: Jan. 9, 2024

(54) METHOD AND SYSTEM FOR PRODUCING AN AT LEAST TWO-LAYER COMPOSITE SERVING AS A LINING FOR A VEHICLE INTERIOR COMPONENT

(71) Applicant: Lisa Draexlmaier GmbH, Vilsbiburg (DE)

(72) Inventor: Robert Thalhammer, Aich (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 258 days.

(21) Appl. No.: 17/497,310

(22) Filed: Oct. 8, 2021

(65) Prior Publication Data

US 2022/0024156 A1    Jan. 27, 2022

Related U.S. Application Data

(63) Continuation of application No. PCT/EP2019/058767, filed on Apr. 8, 2019.

(51) Int. Cl.
*B32B 38/18* (2006.01)
*B29C 70/34* (2006.01)
(Continued)

(52) U.S. Cl.
CPC .......... *B29C 70/342* (2013.01); *B29C 70/443* (2013.01); *B32B 37/12* (2013.01); *B32B 38/1808* (2013.01); *B32B 38/1833* (2013.01); *B29C 43/183* (2013.01); *B29C 2043/185* (2013.01); *B29C 2043/189* (2013.01); (Continued)

(58) Field of Classification Search
CPC ............ B29C 43/183; B29C 2043/185; B29C 2043/189; B29L 2031/3041; B32B 37/12; B32B 38/1808; B32B 18/1833

See application file for complete search history.

(56) References Cited

U.S. PATENT DOCUMENTS 8,057,622 B2 * 11/2011 Wagner ................... B29C 70/78
156/247
2002/0162623 A1 * 11/2002 Saint-Dizier ....... B29C 45/1418
156/267

FOREIGN PATENT DOCUMENTS

DE        19842092       3/2000
DE        102013208841   11/2014

OTHER PUBLICATIONS

Machine translation of DE102013208841 (Year: 2013).*
International Search Report for International Application PCT/EP2019/058767, dated Jul. 4, 2019.

* cited by examiner

*Primary Examiner* — Scott W Dodds
(74) *Attorney, Agent, or Firm* — Burris Law, PLLC

(57) ABSTRACT

A method for manufacturing a composite includes providing a first template including a cutout for a first layer of the composite, disposing the first layer in the cutout, and disposing a tablet, provided with an adhesive, on the first layer such that the first layer adheres to the tablet. Next, the tablet is removed, together with the first layer adhered thereto, from the cutout, and an adhesive is applied to a side of the first layer facing away from the tablet. A second template is provided that includes a cutout for a second layer of the composite, and then the second layer is disposed in the cutout. The tablet, together with the first layer adhered thereto, is disposed on the second layer disposed in the cutout of the second template, and the tablet is removed, together with the composite produced from the first and second layers, from the second template.

15 Claims, 6 Drawing Sheets

(51) Int. Cl.
 B29C 70/44 (2006.01)
 B32B 37/12 (2006.01)
 B29K 105/04 (2006.01)
 B29K 309/08 (2006.01)
 B29L 31/30 (2006.01)
 B29C 43/18 (2006.01)
 B29C 43/36 (2006.01)
(52) U.S. Cl.
 CPC .. *B29C 2043/3605* (2013.01); *B29K 2105/04* (2013.01); *B29K 2309/08* (2013.01); *B29L 2031/3041* (2013.01); *B32B 2605/003* (2013.01)

METHOD AND SYSTEM FOR PRODUCING AN AT LEAST TWO-LAYER COMPOSITE SERVING AS A LINING FOR A VEHICLE INTERIOR COMPONENT

CROSS-REFERENCE TO RELATED APPLICATIONS

This application is a continuation of International Application No. PCT/EP2019/058767, filed on Apr. 8, 2019. The disclosure of the above application is incorporated herein by reference.

FIELD

The present disclosure relates to a method and a system for manufacturing an at least two-layer composite serving as cladding for a vehicle interior.

BACKGROUND

The statements in this section merely provide background information related to the present disclosure and may not constitute prior art.

Composites can be attached as cladding in vehicle interiors in dashboards, center consoles, vehicle doors, columns, and roofs. A composite forming the visible side is often manufactured from a decorative material appearing of high-quality, for example leather. A second underlying layer provides desired haptics, in particular soft-touch haptics. The second layer can be, for example, a spacer fabric, which provides the desired haptics.

In particular with expensive decorative layers, for example those made of high-quality leather, it is desirable that only a small amount of scrap occurs during the manufacturing of such composites. In addition, with such at least two-layer composites it is often difficult to arrange the two layers on each other exactly and to fix them to each other.

Such a composite can be applied as cladding in vehicle interiors, for example in dashboards, center consoles, vehicle doors, columns, and roofs.

SUMMARY

This section provides a general summary of the disclosure and is not a comprehensive disclosure of its full scope or all of its features.

The present disclosure provides an at least two-layer composite serving as cladding for a vehicle interior component which can be simply and efficiently manufactured.

The present disclosure relates to a method and a system for manufacturing an at least two-layer composite serving as cladding for a vehicle interior component.

In the method for manufacturing an at least two-layer composite serving as cladding for a vehicle interior component according to the present disclosure, a first template comprises a cutout for a first layer of the composite. Then, the first layer is disposed in the cutout of the first template. Subsequently, a tablet provided with an adhesive is disposed on the first layer disposed in the cutout, such that the first layer adheres to the tablet.

Then, together with the first layer adhered thereto, the tablet is removed from the cutout of the first template, and an adhesive is applied on a side of the first layer facing away from the tablet. Furthermore, a second template including a cutout for a second layer of the composite is provided. The second layer is disposed in the cutout of the second template.

Then, together with the first layer adhered thereto and provided with the adhesive, the tablet is disposed on the second layer disposed in the cutout of the second template and disposed in the cutout of the second template.

As a result, the first layer adheres to the second layer. Due to the mutually adapted shape of the cutouts in the two templates and the contour of the tablet, the two layers are automatically disposed precisely in terms of position with respect to each other or against each other. Subsequently, the tablet is removed from the second template together with the composite produced from the two layers.

The tablet and the cutouts are thus shaped such that the tablet fits into the two cutouts. In one form of the present disclosure, the cutouts may have a similar contour. In other forms of the present disclosure, the cutouts may have different shapes. The shape of the tablet and of the templates is such that it can be repeatably disposed in its cutouts in the same relative position with respect to the respective templates. It is thereby automatically provided that the two layers can only be positioned with respect to each other and connected to each other in their intended arrangement.

The first layer can be, for example, a spacer fabric or a foam. The second layer can be, for example, a decorative layer made of leather. Other decorative layers as the second layer are also possible. The two layers are then trimmed such that they fit into the respective cutouts of the templates. Due to the use of the templates with their cutouts, whose contours are adapted to the contour of the tablet, the two layers of the composite are disposed precisely against each other or one-atop-the-other.

In particular, it is optional to subsequently cut one or both layers after connecting the layers to each other. Instead, the layers of the at least two-layer composite can be correspondingly trimmed in the preliminary stage, i.e., before the inserting into the respective templates, the composite is adapted to the shape of the cutouts. Then the respective layers need simply be disposed in the respective cutouts of the templates.

With the aid of the tablet, the first layer can be removed from the cutout of the first template, and after the coating with the adhesive to dispose it on the second layer, which has previously been disposed in the cutout of the second template. The handling of the tablet can be carried out, for example, by a robot, so that the steps connected to the handling of the tablet can be automated.

In particular, the first and the second layer may be arranged with respect to each other such that, for example, the second layer protrudes beyond the first layer circumferentially or at least at some edge regions and thus forms edge fold regions, which serve to attach the second layer to the respective vehicle interior component. The protruding regions of the second layer can also be partially used, for example, to stitch down the second layer to the respective vehicle interior component.

Using the templates and the tablet it is thus possible to arrange the two layers of the composite precisely with respect to each other in a simple and efficient manner, and also to produce one of the layers with a certain excess in comparison to the other layer and to attach it thereto.

One possible form of the present disclosure provides that at least one of the templates has a modular design comprising a plurality of segment variants, and is assembled from a selection of the segment variants adapted to a shape of the respective layer. If, for example, the blank of one of the layers is damaged, the entire templates do not need to be remade. Instead, some of the segment variants can simply be exchanged. Over the lifetime of a vehicle it can also occur, for example, that the blank of one of the layers changes slightly. Also, in this case, some of the segment variants can simply be exchanged for other segment variants, so that the shaping of the templates and in particular their cutouts can be adapted to the new material cutout. In particular, it is possible that the segment variants are screwed to each other, for example. The segment variants can thereby be very easily releasably attached to each other.

According to a further form of the present disclosure, the templates include respective positioning elements, into which the tablet is inserted with respective corresponding positioning elements, and thereby centered with respect to the templates in an intended position. The positioning elements of the templates can be, for example, depressions, projections, bulges, or the like, wherein the corresponding positioning elements are correspondingly formed on the tablet. Due to the interaction of the positioning elements of the templates and of the tablet, it is possible, for example, for a worker or for a robot to position the tablet precisely in its intended arrangement inside the cutouts of the respective templates. As a result, a position-precise arrangement of the layers of the composite with respect to each other is also provided. In both templates the positioning elements are precisely equally disposed, such that both in the first and in the second template the positioning elements are disposed and aligned equally with respect to each other. It can thereby be provided that during the inserting of the tablet into the respective cutouts of the templates, the tablet is always disposed identically with respect to the positioning elements of the respective templates. The first layer received using the tablet is thereby always disposed identically with respect to the second layer when the tablet is inserted into the cutout of the second template together with the first layer adhered thereto, in which second template the second layer has previously been disposed. The cutouts can include, for example, stops, so that the first layer or the layer can also be disposed in the same position and alignment inside the cutouts by moving the layers against the stops.

A further form of the present disclosure provides that the tablet is provided with a double-sided adhesive tape on which the first layer adheres. Said adhesive on the tablet can thus be a double-sided adhesive tape attached to the tablet. In addition, the double-sided adhesive tape can be repeatedly reused, wherein the first layer can again be pulled off of the double-sided adhesive tape. The double-sided adhesive tape can have, for example, the same contour as the tablet, and thereby completely cover one side of the tablet.

According to a further form of the present disclosure, at least one of the templates is manufactured from polyoxymethylene. Adhesives usually adhere poorly to polyoxymethylene or do not adhere to it at all.

According to a further form of the present disclosure, the tablet is manufactured from glass-fiber reinforced plastic. Glass-fiber reinforced plastic does not have shrinking behavior, in particular even with temperature changes. Therefore, during the manufacturing method the tablet does not expand under heat influence and does not contract during cooling. A result of such expansion and contraction of the tablet would be that the first layer disposed thereon could correspondingly be deformed.

A further form of the present disclosure provides that a melt adhesive is applied on the first layer as the adhesive. The applying of the melt adhesive can be carried out, for example, by a roller application using a corresponding device. In contrast to a spray application, for example, the melt adhesive can thus be applied in a targeted manner exclusively onto the first layer without the melt otherwise still being distributed. The melt adhesive is relatively soft which provides good haptics with the composite manufactured from the at least two layers. After the applying of the melt adhesive, the first layer together with the tablet can be supplied to a flash station, using which the melt adhesive is slightly melted, for example, by infrared radiation, and made adhesive.

A further form of the present disclosure provides that the second layer is sucked onto the second template by under pressure. For example, a plurality of openings can be provided in the cutout of the second template, to which openings an under pressure can be applied. As soon as this has once been precisely positioned in a fitted manner, the second layer can thereby be fixedly held inside the cutout of the second template. It can thereby be provided, in particular, that the first layer can be disposed precisely on the second layer and fixed thereto.

According to a further form of the present disclosure, the second layer is cut smaller than the cutout of the second template. In particular, if the second layer is manufactured from leather, it can thereby be provided that the second layer does not have waves or other irregularities, since in each case the second layer is smaller than the cutout of the second template. The second layer can thereby be disposed smoothly in the cutout of the second template. The second template can be disposed slightly inclined, for example, so that the second layer automatically slips downward inside the cutout of the second template due to gravity, and abuts corresponding abutment surfaces inside the cutout. A precise aligning and arrangement of the second layer inside the cutout of the second template are thereby facilitated for a worker.

According to a further form of the present disclosure, after the removal from the second template, the composite is removed from the tablet, and with pressure and heating the layers are irreversibly connected to each other. The composite can be configured, for example, permanently mutually adhered using a flat-bed laminating machine under pressure and heating. Adhesive is reacted, in particular cross-linked, to the adhesive previously applied to the first layer, so that the two layers then firmly adhere to each other.

A further form of the present disclosure provides that after the heat influence, the layers are cooled. This may occur inside the same device or machine, using which the layers are connected to each other under pressure and heating. For this purpose, a suitable cooling line can be provided in the mentioned device or machine. A subsequent slipping of the layers with respect to each other is inhibited by the cooling.

The system for manufacturing an at least two-layer composite serving as cladding for a vehicle interior component comprises a first template including a cutout for a first layer of composite, a tablet, and a second template including a cutout for a second layer of the composite, wherein the templates and the tablet are shaped such that the tablet respectively only fits into the recesses in a certain arrangement. Possible designs of the inventive method are to be regarded as possible designs of the inventive system and vice versa, wherein the system includes in particular means for carrying out the method steps.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
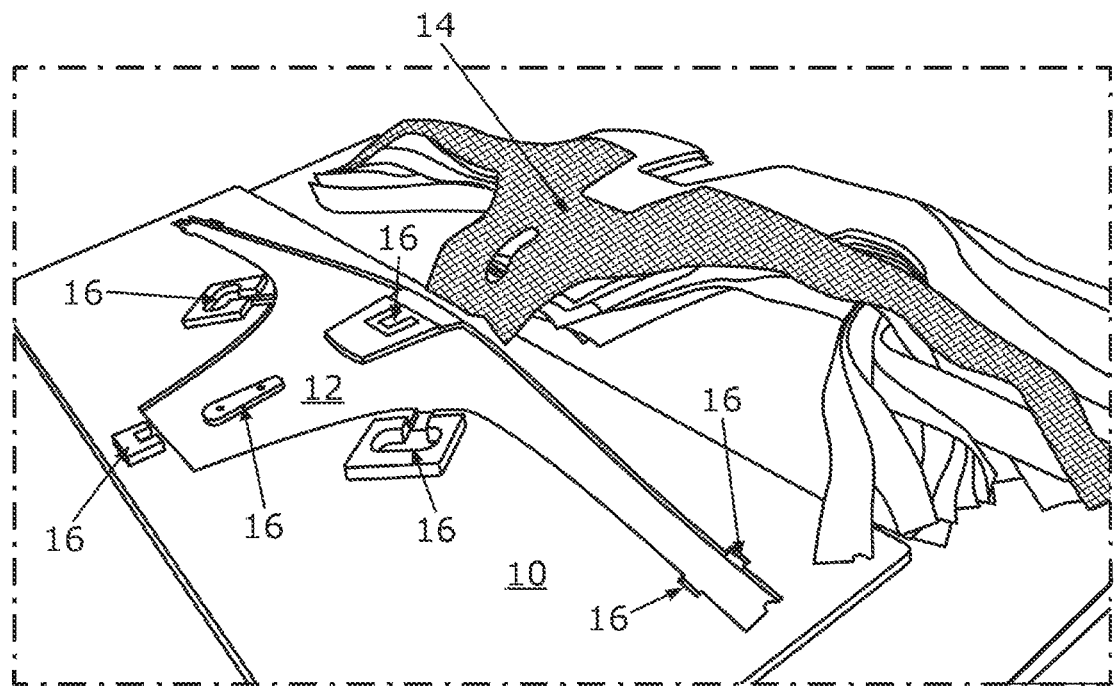
FIG. 1 illustrates a perspective view of a first template including a cutout for a spacer fabric according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A first template 10 including a cutout 12 for a spacer fabric 14 is illustrated in a perspective view in FIG. 1. The spacer fabric 14 forms a first layer of a composite that serves as cladding for a vehicle interior component. The shape or contour of the cutout 12 corresponds to the shape or contour of the spacer fabric 14. The template 10 includes a plurality of positioning elements 16, which will be described in more detail below.

Figure 2:
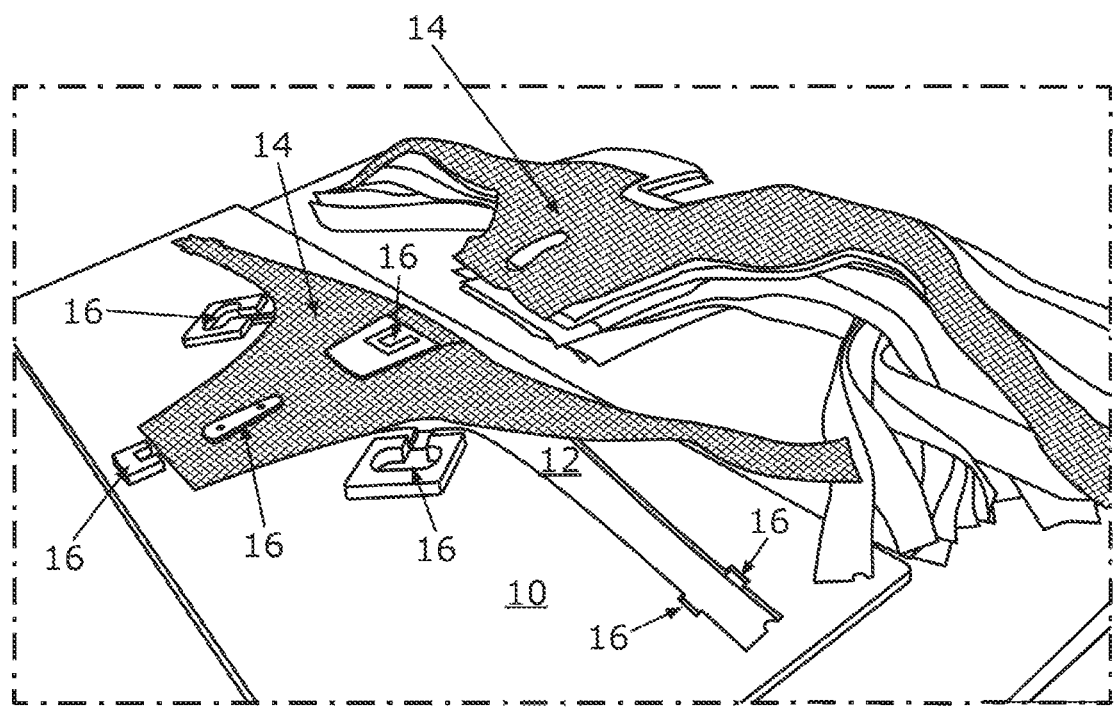
FIG. 2 illustrates a further perspective view of the first template according to the present disclosure, wherein a spacer fabric has been disposed partially in the cutout of the first template.

In FIG. 2, the first template 10 is illustrated in a further perspective view, specifically while one of the spacer fabrics 14 is precisely inserted into the cutout 12. The spacer fabric 14 can be inserted precisely into the cutout 12.

Figure 3:
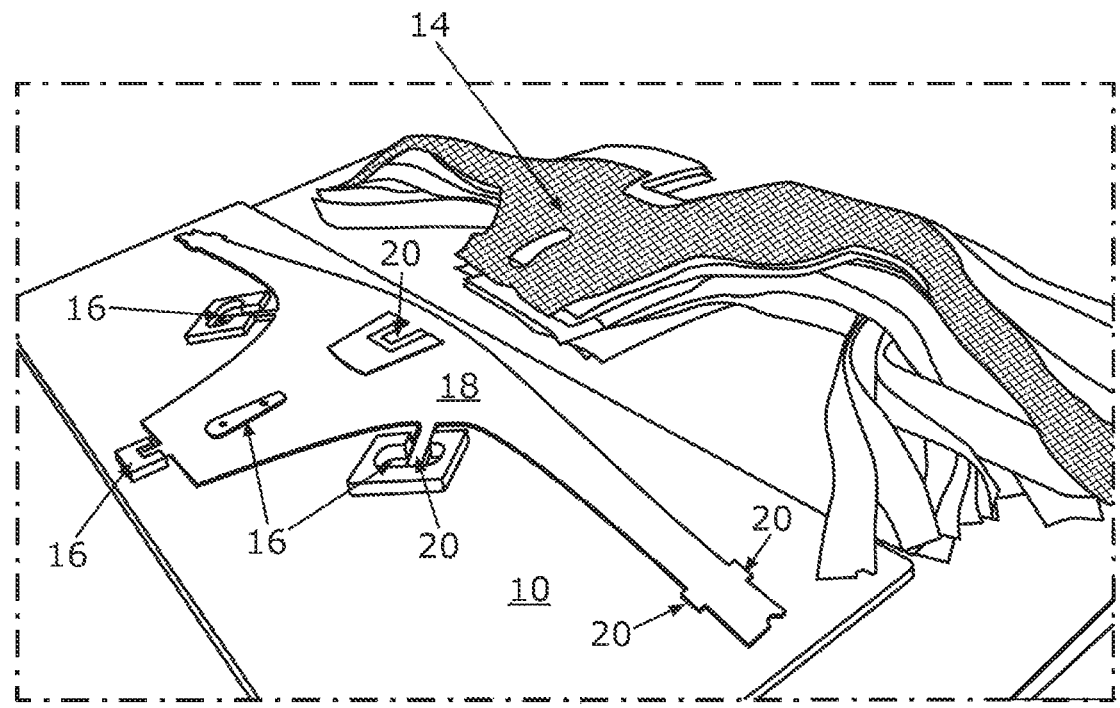
FIG. 3 illustrates a further perspective view of the first template according to the present disclosure, wherein after inserting of the spacer fabric, a tablet has also been inserted into the cutout.

In FIG. 3, the first template 10 is illustrated in a further perspective view. A tablet 18 provided with an adhesive, such tablet 18 having a similar contour to the cutout 12 of the first template 10, is disposed on the first layer, i.e., on the spacer fabric 14, disposed in the cutout 12, as a result of which the side of the tablet 18 adheres to the spacer fabric 14 that has previously been disposed in the cutout 12 of the first template 10.

The tablet 18 includes respective positioning elements 20, which correspond to the above-mentioned positioning elements 16 of the first template 10. The positioning elements 20 of the tablet 18 are configured in the form of tabs, wherein the positioning elements 16 are configured in the form of cutouts. Other shapes of the positioning elements 20, 16 are also possible. It is desired that the positioning elements 16, 20 interact such that the tablet 18 can be inserted precisely into the cutout 12 only in the same relative position with respect to the template 10.

Figure 4:
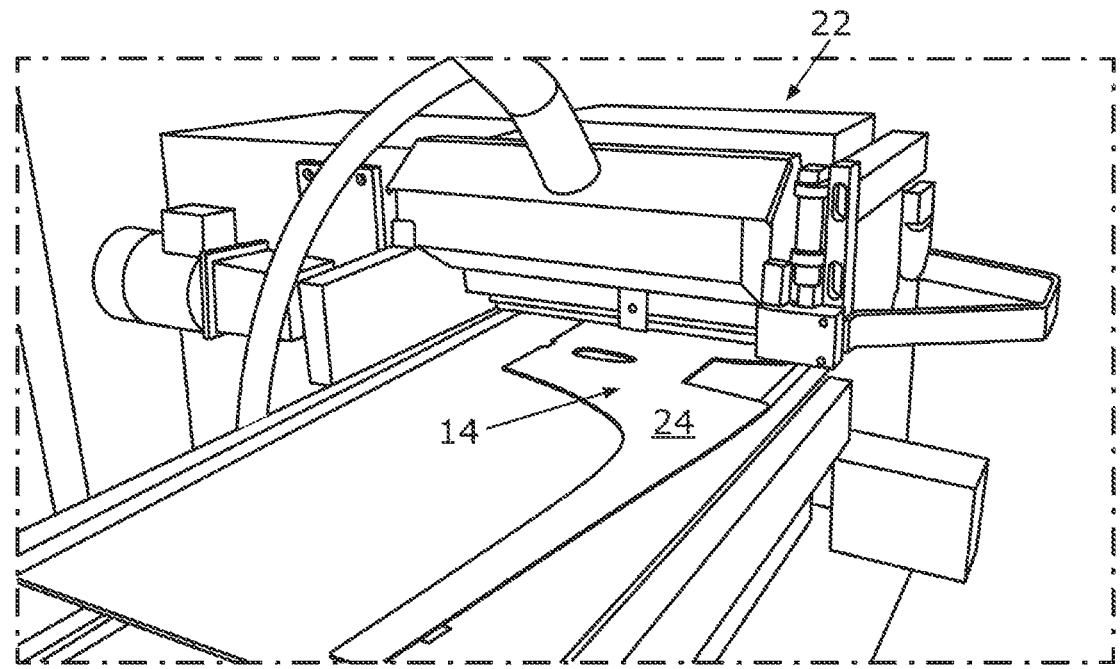
FIG. 4 illustrates a perspective view of a device in which the tablet has been arranged together with the spacer fabric adhered therein, in order to provide the spacer fabric with an adhesive.

After the inserting into the cutout 12 of the first template 10, the tablet 18, together with the spacer fabric 14 adhered thereto, is removed from the cutout 12 of the first template 10, and is supplied to a device 22 depicted in FIG. 4. Using this device 22, an adhesive, in one form of the present disclosure a melt adhesive, is applied by a roller application onto a side 24 of the spacer fabric 14, which side 24 faces away from the tablet 18. The melt adhesive is applied flatly and homogeneously onto the side 24 of the spacer fabric 14 facing away from the tablet 18 by the roller application, specifically without the melt adhesive—such as happens, for example, with a spray application—still being distributed in an unfavorable manner inside a production location.

Figure 5:
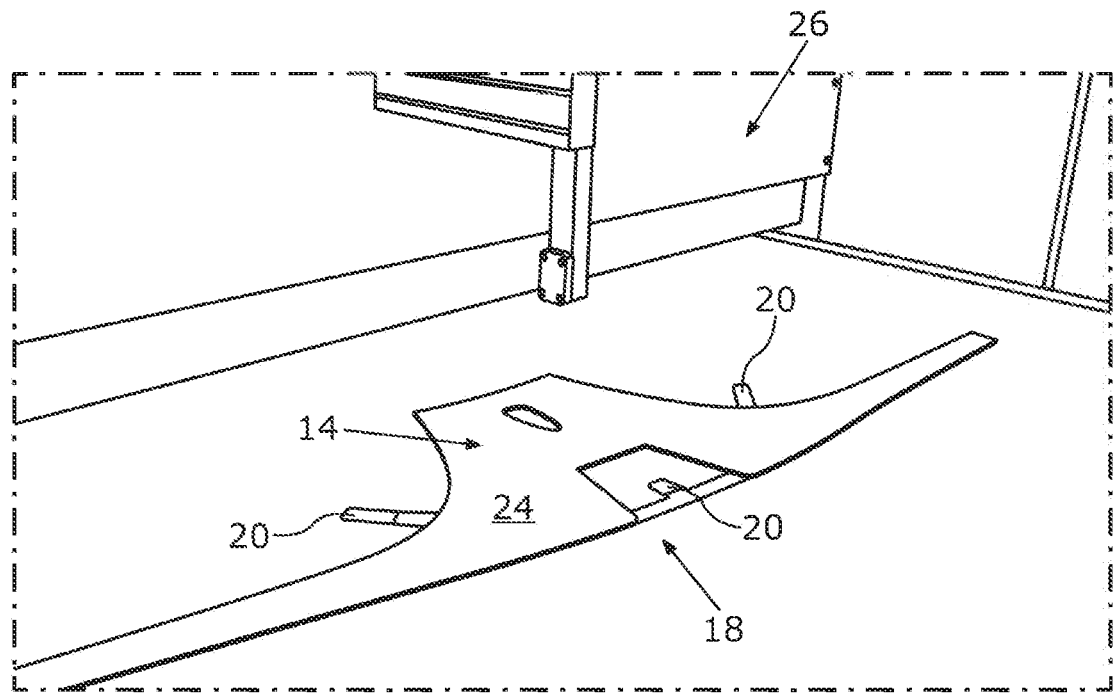
FIG. 5 illustrates a further device, using which the applied adhesive is activated by infrared radiation.

After the adhesive application, for activating the adhesive, the spacer fabric 14 is supplied to a further device 26, for example, a flash station, as illustrated in FIG. 5. Using the further device 26, the adhesive is activated by infrared radiation. Meanwhile, the spacer fabric 14 further adheres to the tablet 18.

Figure 6:
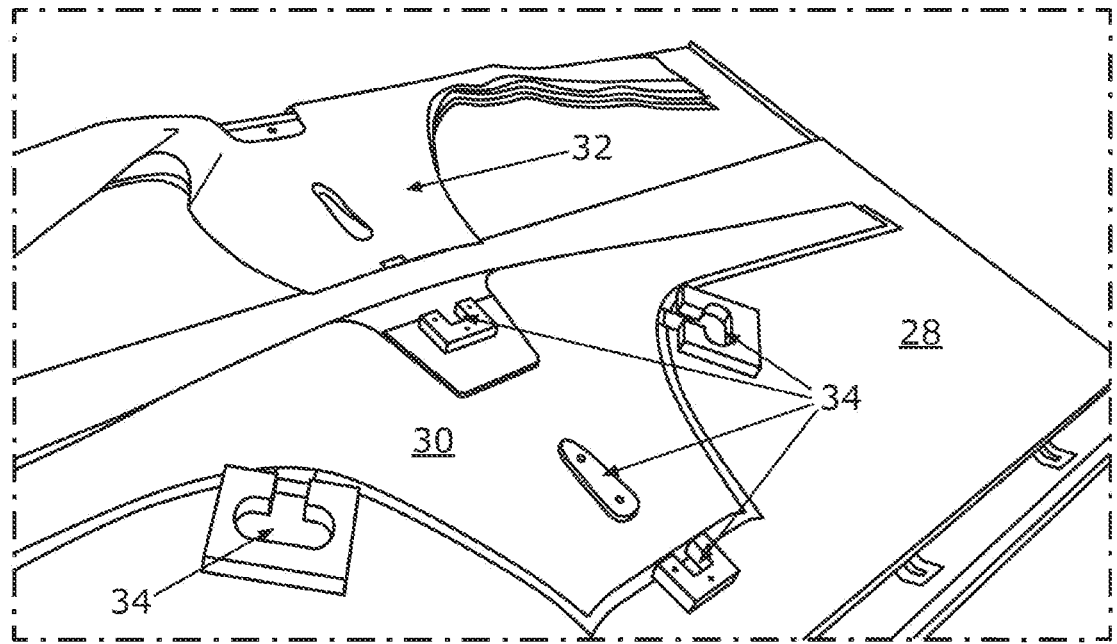
FIG. 6 illustrates a perspective view of a second template including a cutout for a decorative layer manufactured from leather according to the present disclosure.

In FIG. 6, a second template 28 is illustrated in a perspective view. The second template 28 includes a cutout 30, which receives a decorative layer 32 manufactured from leather. Like the first template 10, the second template 28 comprises a plurality of positioning elements 34, which are disposed exactly as the positioning elements 16 in the first template 10. The cutout 12 of the first template 10 and the cutout 30 of the second template 28 have the same contour or the same shape.

The decorative layers 32 are cut smaller from their blank than the cutout 30 of the second template 28. In addition, the second template 28 is disposed slightly inclined, so that during the inserting or disposing of the respective decorative layers 32, they slip automatically into their intended position due to gravity.

Figure 7:
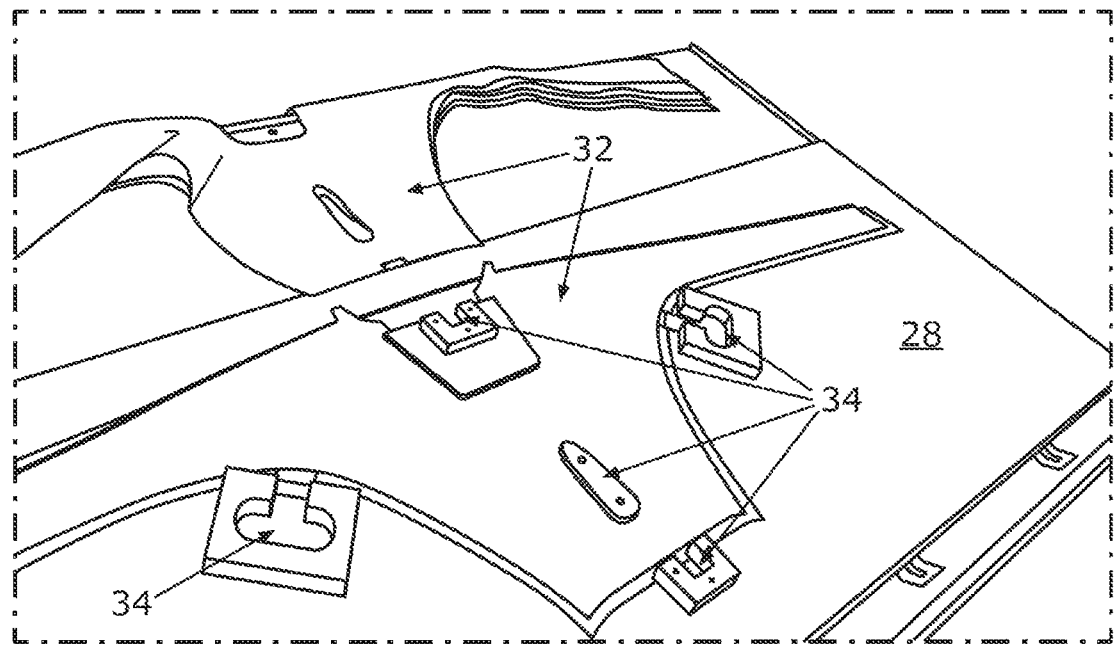
FIG. 7 illustrates a further perspective view of the second template according to the present disclosure after the decorative layer manufactured from leather has been inserted into the cutout of the second template.

In FIG. 7, the second template 28 is illustrated in a further perspective view, and specifically after one of the decorative layers 32 manufactured from leather has been positioned in the cutout 30 of the second template 28. After the decorative layer 32 has been disposed as intended inside the second template 28, an under pressure can be generated in the region of the cutout 30 (not shown), so that the decorative layer 32 is sucked onto the second template 28.

Figure 8:
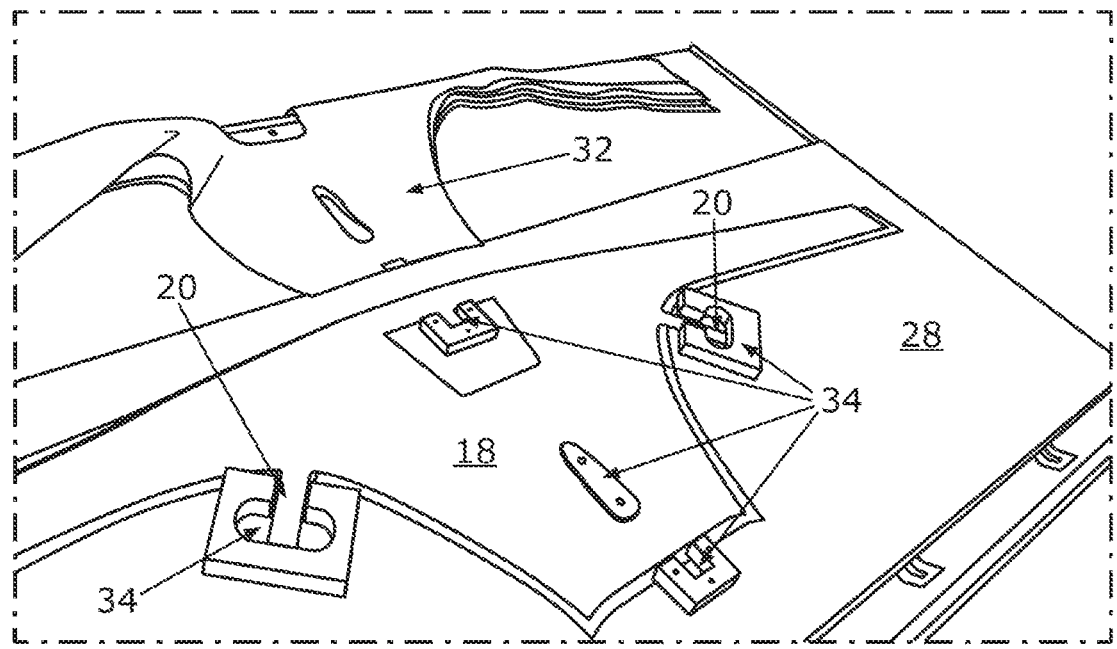
FIG. 8 illustrates a further perspective view of the second template according to the present disclosure, wherein the tablet, together with the spacer fabric adhered thereto, has been positioned on the decorative layer manufactured from leather.

In FIG. 8, the second template 28 is illustrated in a further perspective view, wherein the tablet 18, together with the spacer fabric 14 adhered thereto and provided with the melt adhesive, has been positioned on the decorative layer 32 disposed in the cutout 30 of the second template 28, and positioned in the cutout 30. The tab-shaped positioning elements 20 provide position-precise and desired aligning and arranging of the tablet 18 inside the cutout 30 of the second template 28. Since the positioning elements 34 of the second template 28 are disposed exactly as the positioning elements 16 of the first template 10, the tablet 18 is aligned and disposed as precisely with respect to the positioning elements 34 as with respect to the positioning elements 16. By pressure exertion on the template 28, the spacer fabric 14 provided with the melt adhesive is pressed onto a rear side of the decorative layer 32 and adheres thereto.

Figure 9:
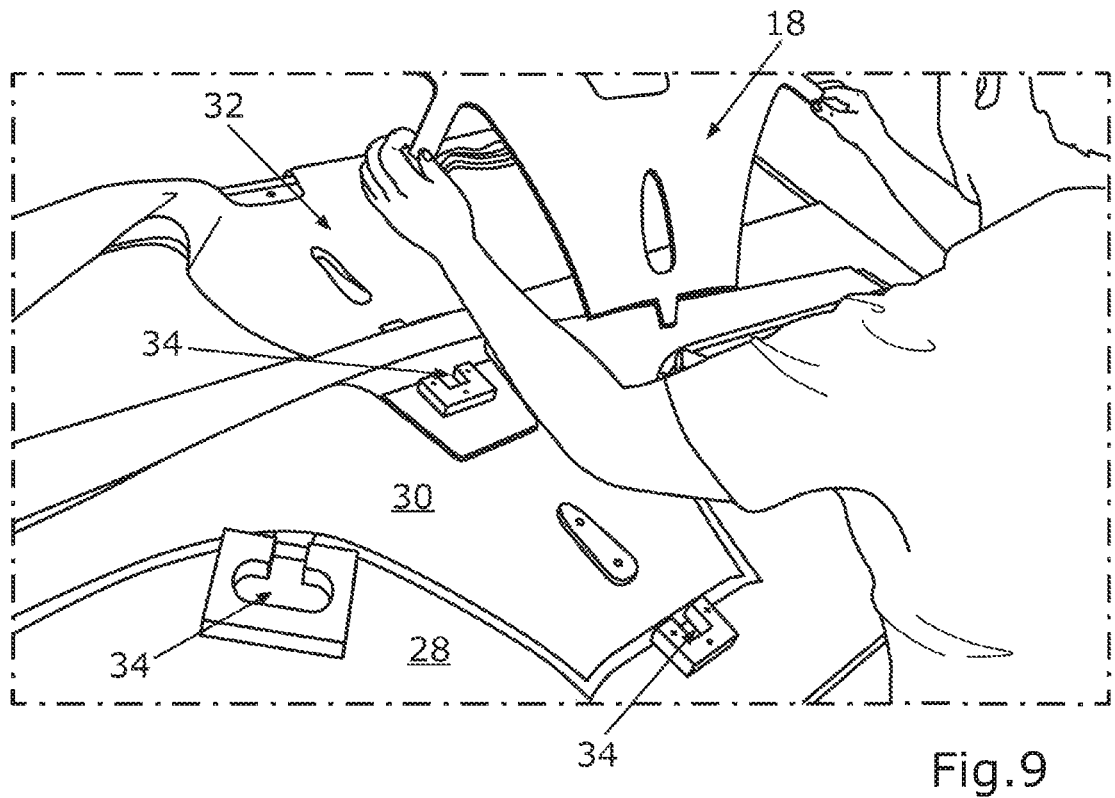
FIG. 9 illustrates a further perspective view of the second template according to the present disclosure while the tablet is removed together with the composite produced from the spacer fabric and the decorative layer.

FIG. 9 illustrates how the tablet 18, together with the composite manufactured from the two layers, i.e., the spacer fabric 14 and the decorative layer 32, is removed from the second template 28.

Figure 10:
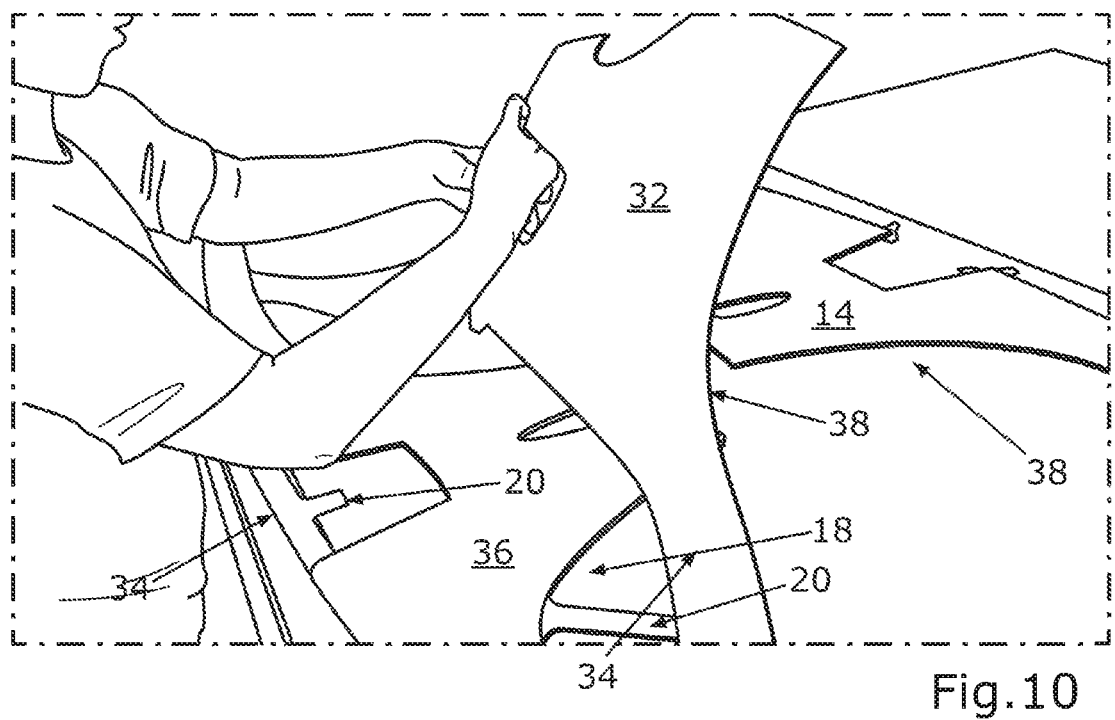
FIG. 10 illustrates a separating process of the composite from the tablet according to the present disclosure.
Figure 11:
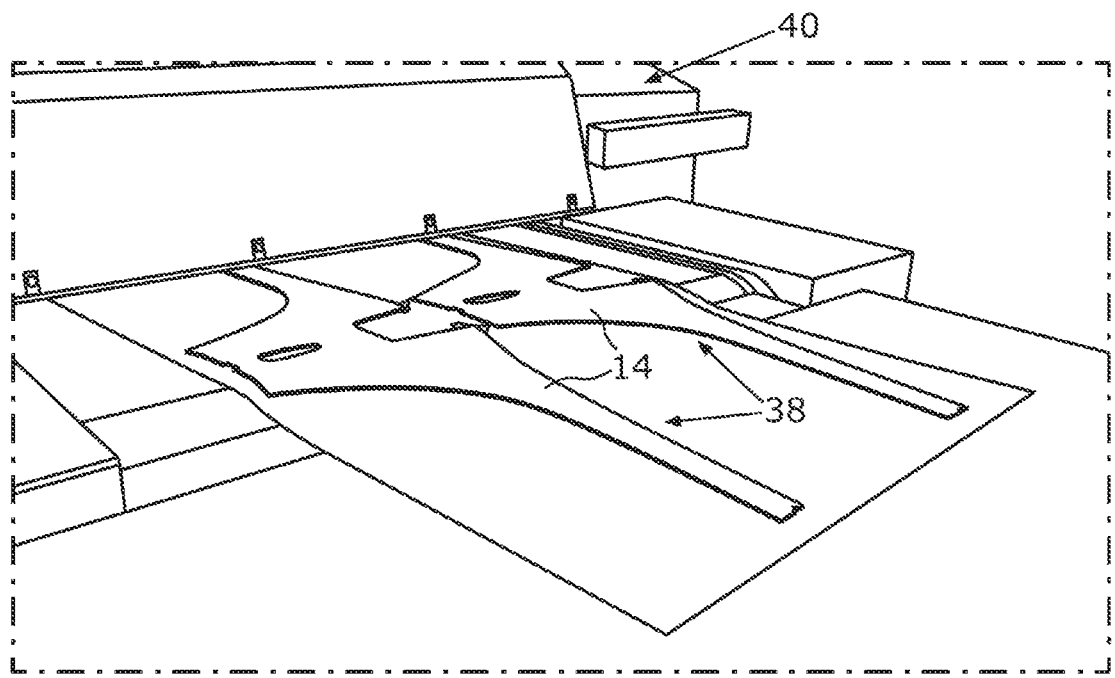
FIG. 11 illustrates a perspective view of a flat-bed laminating machine, using which two of the composites are subjected to pressure and heat according to the present disclosure.

In FIG. 10, the tablet 18 can be seen in a perspective view, and specifically after the composite 38 has been removed from the spacer fabric 14 and the decorative layer 32 from the tablet 18. A double-sided adhesive tape 36 has been applied to the tablet 18. The double-sided adhesive tape 36 adheres the spacer fabric 14 to the tablet 18 when it is placed on the spacer fabric 14 or pressed after it has been inserted into the cutout 12 of the first template 10. The composite 38, in particular the spacer fabric 14, can be pulled back from the double-sided adhesive tape 36 without damage and thus removed from the tablet 18. In the present representation a further composite 38 can be seen that has been placed on its decorative layer 32 not indicated here in more detail In FIG. 11, the two composites 38 can be seen, specifically while they are supplied to a flat-bed laminating machine 40. Using this flat-bed laminating machine 40, under pressure and heating the respective spacer fabric 14 and the decorative layers 32 manufactured from leather are connected to each other, since the melt adhesive is thereby cross-linked and the spacer fabric 14 and the decorative layers 32 are thereby connected to each other. After the heating, the composite 38 is cooled using the flat-bed laminating machine 40, such that the respective spacer fabric 14 and the respective decorative layers 32 cannot still slip with respect to each other.

Figure 12:
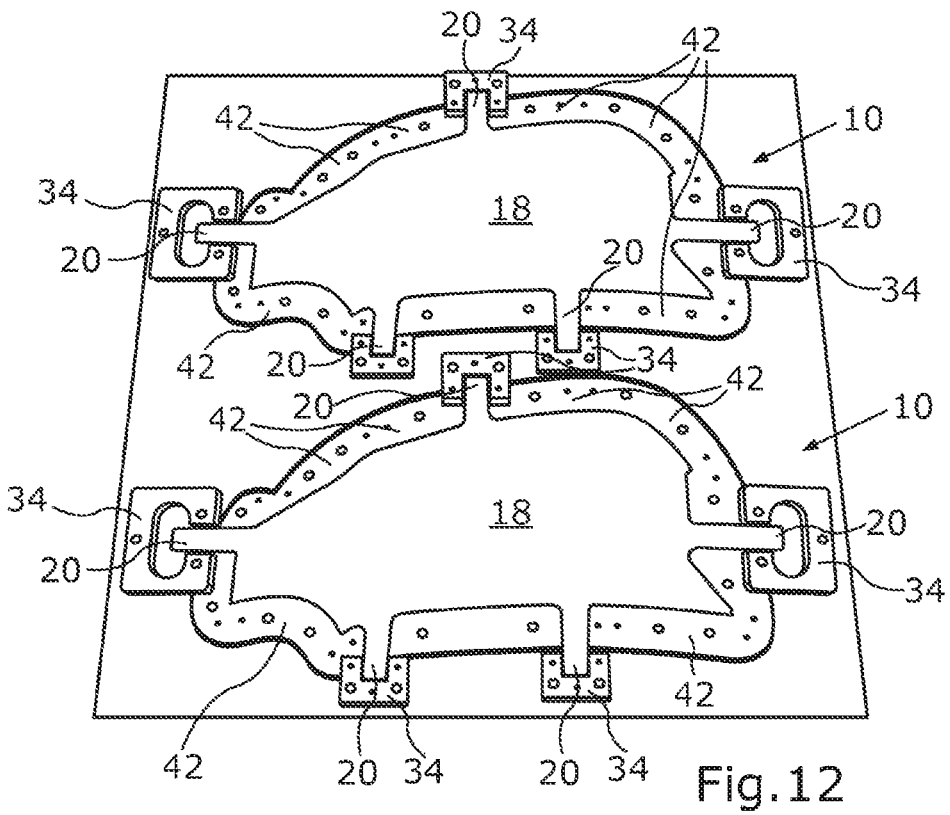
FIG. 12 illustrates a perspective view of a further form of the first template according to the present disclosure, wherein it is assembled from a plurality of segments.

In FIG. 12, a further possible form of the first template 10 is illustrated. The template 10 has a modular design comprising a plurality of segment variants 42, which can be configured differently, depending on the shape or contour of the layers, i.e., the respective spacer fabric 14 and the decorative layers 32, and screwed to each other. Due to the segment-type design, it is possible to change blanks without having to change the entire template 10. The second template 28 can also be assembled from such segment variants 42.

The templates 10, 28 and the tablet 18 together thus form a system for manufacturing the two-layer composite 38 serving as cladding for a vehicle interior component. Since the cutouts 12, 30 of the templates and the tablet 18 are adapted to each other with respect to their shape, the two layers of the composite 38, i.e., the spacer fabric 14 and the decorative layer 32 manufactured from leather, can be aligned with respect to each other and attached to each other. The use of the templates 10, 28 and the tablet 18 is not limited to spacer fabric 14 and decorative layers 32 manufactured from leather. In principle, all types of layers can be manufactured into such composites 38 in the manner described by using the templates 10, 28 and the tablet 18.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing an at least two-layer composite cladding for a vehicle interior component, the method comprising:
    providing a first template including a cutout for a first layer of the at least two-layer composite;
    disposing the first layer in the cutout of the first template;
    disposing a tablet provided with a first adhesive on the first layer disposed in the cutout, and in the cutout of the first template, such that the first layer adheres to the tablet;
    removing the tablet, together with the first layer adhered to the tablet, from the cutout of the first template, and applying a second adhesive to a side of the first layer facing away from the tablet;
    providing a second template including a cutout for a second layer of the at least two-layer composite;
    disposing the second layer in the cutout of the second template;
    disposing the tablet together with the first layer, and provided with the second adhesive, on the second layer disposed in the cutout of the second template, and in the cutout of the second template; and
    removing the tablet together with the at least two-layer composite produced from the first and second layers from the second template.

2. The method according to claim 1, wherein the second layer is manufactured from leather.

3. The method according to claim 2, wherein the first layer comprises one of a spacer fabric or a foam.

4. The method according to claim 3, wherein the second layer is manufactured from leather.

5. The method according to claim 1, wherein at least one of the first template and the second template has a modular design made of a plurality of segment variants, and is assembled, adapted to a shape of the respective layer, from a selection of the segment variants.

6. The method according to claim 5, wherein the segment variants are screwed to each other.

7. The method according to claim 1, wherein the first and second templates include respective positioning elements, into which the tablet is inserted with respective corresponding positioning elements, and thereby centered in an intended position with respect to the templates.

8. The method according to claim 1, wherein the first adhesive is with a double-sided adhesive tape.

9. The method according to claim 1, wherein at least one of the first and second templates is manufactured from polyoxymethylene.

10. The method according to claim 1, wherein the tablet is manufactured from glass-fiber reinforced plastic.

11. The method according to claim 1, wherein the second adhesive is a melt adhesive.

12. The method according to claim 1, wherein the second layer is sucked onto the second template by an under pressure.

13. The method according to claim 1, wherein the second layer is cut smaller than the cutout of the second template.

14. The method according to claim 1, wherein after the removing from the second template, the at least two-layer composite is removed from the tablet, and the first and second layers are connected using pressure and heating.

15. The method according to claim 14, wherein after heating, the first and second layers are cooled.

* * * * *